US012533781B2

(12) United States Patent
Baudrand et al.

(10) Patent No.: US 12,533,781 B2
(45) Date of Patent: *Jan. 27, 2026

(54) ELECTROPORTABLE DEVICE

(71) Applicant: Illinois Tool Works Inc., Glenview, IL (US)

(72) Inventors: Olivier Baudrand, Paris (FR); Pascale Grandjean, Guilherand-Granges (FR); Frederic Nayrac, Bourg-lès-Valence (FR); Christian Ricordi, Bourg-lès-Valence (FR)

(73) Assignee: Illinois Tool Works Inc., Glenview, IL (US)

(*) Notice: Subject to any disclaimer, the term of this patent is extended or adjusted under 35 U.S.C. 154(b) by 28 days.

This patent is subject to a terminal disclaimer.

(21) Appl. No.: 18/684,585

(22) PCT Filed: Sep. 7, 2022

(86) PCT No.: PCT/US2022/042691

§ 371 (c)(1),
(2) Date: Feb. 16, 2024

(87) PCT Pub. No.: WO2023/038926

PCT Pub. Date: Mar. 16, 2023

(65) Prior Publication Data

US 2024/0383117 A1 Nov. 21, 2024

(30) Foreign Application Priority Data

Sep. 8, 2021 (FR) .................................... 2109409

(51) Int. Cl.
*B25C 1/06* (2006.01)

(52) U.S. Cl.
CPC .................................. *B25C 1/06* (2013.01)

(58) Field of Classification Search
CPC ....................................................... B25C 1/06
See application file for complete search history.

(56) References Cited

U.S. PATENT DOCUMENTS 3,811,313 A * 5/1974 Schut ....................... B21J 15/24
83/575
4,183,453 A * 1/1980 Barrett ...................... B25C 5/15
227/120

(Continued)

FOREIGN PATENT DOCUMENTS

EP 3838493 A1 6/2021

OTHER PUBLICATIONS

International Search Report and Written Opinion from International Application No. PCT/US2022/042691, mailed Feb. 1, 2023 (13 pages).

*Primary Examiner* — Lucas E. A. Palmer
(74) *Attorney, Agent, or Firm* — Neal, Gerber & Eisesnberg LLP

(57) ABSTRACT

A portable electric device comprising a cylinder in which at least one movable piston slides between a start position corresponding to the top of the cylinder and an end position corresponding to the bottom of the cylinder, said piston comprising a mechanism configured to come into contact with an element to be operated once the piston is in the end position or is between the start position and the end position. More particularly, the portable electric device comprises: a power supply mechanism intended to supply power to a first fixed coil, the first fixed coil being positioned facing an expulsion mechanism for expelling the piston when the piston is in the start position, the expulsion mechanism being secured to a first face of the movable piston; and at least one braking mechanism for braking the piston that are configured to brake the piston when the piston is in the end position or approaching the end position. The movable piston being (Continued)

composed of: a first part made from a first material having an electromagnetic capability suitable for reducing magnetic losses and limiting the induction saturation; and a second part made from a second material suitable for withstanding shocks while or after the piston makes contact with the braking mechanism; the first part being separated from said braking mechanism by the second part.

9 Claims, 1 Drawing Sheet

(56) References Cited

U.S. PATENT DOCUMENTS

| | | | | |
|---|---|---|---|---|
| 4,215,297 | A * | 7/1980 | Jacquemet | B25D 11/064<br>318/132 |
| 4,293,088 | A * | 10/1981 | Barrett | B25C 1/06<br>227/120 |
| 5,809,157 | A * | 9/1998 | Grumazescu | H04R 9/063<br>335/229 |
| 2007/0215667 | A1 * | 9/2007 | Huang | B25C 1/00<br>227/11 |
| 2010/0032468 | A1 * | 2/2010 | Gross | B25C 1/06<br>227/156 |
| 2013/0334277 | A1 * | 12/2013 | Shima | B25C 1/06<br>318/114 |
| 2013/0336809 | A1 | 12/2013 | Antoun et al. | |
| 2018/0141198 | A1 * | 5/2018 | Fan | H02J 7/345 |
| 2021/0060750 | A1 * | 3/2021 | Dittrich | H02K 7/145 |
| 2021/0387317 | A1 * | 12/2021 | Dittrich | B25C 1/08 |
| 2024/0383116 | A1 * | 11/2024 | Baudrand | B25C 1/06 |

* cited by examiner

ELECTROPORTABLE DEVICE

PRIORITY CLAIM

This application is a national stage application of PCT/US2022/042691, filed on Sep. 7, 2022, which claims priority to and the benefit of French Application No. 2109409, filed Sep. 8, 2021, the entire contents of which are incorporated herein by reference.

TECHNICAL FIELD

The present disclosure relates to a electroportable or portable electric device. More specifically, the present disclosure relates to a portable electric device of the nail driving tool type, the configuration of the movable piston of which is improved to withstand shocks throughout the nailing phases.

BACKGROUND

Well-known portable electric tools use an electric motor driving a flywheel or a geared motor compressing a spring in order to store mechanical energy that makes it possible to set movable parts of the portable electric device in movement, such as for example a piston fitted with a firing pin in the case of a nail driving tool.

The drawbacks of this type of solution are numerous, in particular a reduced service life caused by the numerous shocks to which the pistons are subjected, weak output and high weight.

It would therefore be advantageous to provide the operator with a portable electric tool which alleviates the problems cited, and more specifically a solution aiming to improve the service life of such a tool, by proposing a particular configuration of the pistons employed, and more generally of the movable parts.

SUMMARY

The present disclosure relates to a portable electric device comprising a cylinder in which at least one movable piston slides between a start position corresponding to the top of the cylinder and an end position corresponding to the bottom of the cylinder, said piston comprising a mechanism configured to come into contact with an element to be operated once the piston is in the end position or is between the start position and the end position.

More specifically, the portable electric device comprises: (1) a power supply mechanism intended to supply power to a first fixed coil, the first fixed coil being positioned facing an expulsion mechanism for expelling the piston when the piston is in the start position, the expulsion mechanism being secured to a first face of the movable piston; and (2) at least one braking mechanism for braking the piston that are configured to brake the piston when the piston is in the end position or approaching the end position. The movable piston being composed of: (A) a first part made from a first material having an electromagnetic capability suitable for reducing magnetic losses and limiting the induction saturation; and (B) a second part made from a second material suitable for withstanding shocks while or after the piston makes contact with the braking mechanism; the first part being separated from said braking mechanism by the second part.

Advantageously, the braking mechanism is arranged over all or part of the bottom of the cylinder.

Advantageously, the expulsion mechanism is secured to a first face of the movable piston, said first face being located facing the first fixed coil.

Moreover, the first material is an isotropic, soft magnetic composite material with high resistivity, for example of Somaloy type.

Advantageously, the second material is a material with damping properties.

Additionally, the second material and the braking mechanism conform to one another when the piston is in the end position.

Moreover, the expulsion mechanism is a conductive metallic ring secured to the first part of the movable piston.

In a variant, the expulsion mechanism is a coil secured to the first part of the movable piston.

In a variant, the first part is surrounded by the second part, the second part being entirely or partially composed of said second material, the first face being secured to the second part.

BRIEF DESCRIPTION OF THE SEVERAL VIEWS OF THE DRAWINGS

Embodiments of the present disclosure will now be described solely by way of example with reference to the drawings of FIGS. 1 and 2.

DETAILED DESCRIPTION

Figure 1:
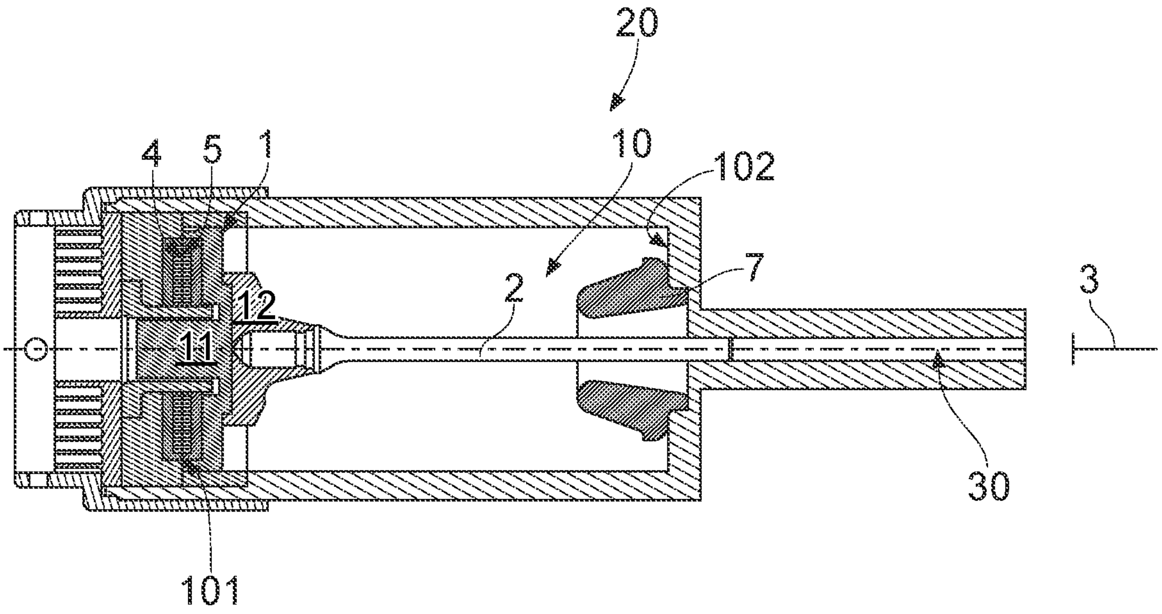
FIG. 1 illustrates a portable electric device according to one embodiment of the present disclosure in a start position before activation of the piston.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connection of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, etc., are not intended to be limited to direct mounting methods, but should be interpreted broadly to include indirect and operably coupled, mounted, connected, and like mounting methods. This specification is intended to be taken as a whole and interpreted in accordance with the principles of the present disclosure and as understood by one of ordinary skill in the art.

To avoid any doubt, all the features described here likewise apply to any aspect of the present disclosure.

In the context of the present application, it is expressly provided that the various aspects, embodiments, examples and alternatives mentioned in the above paragraphs, in the claims and/or in the description and the following drawings, and in particular the individual features thereof, may be taken independently or in any combination. In other words, all of the embodiments and/or the features of any embodiment may be combined in any way, unless these features are incompatible.

To avoid any ambiguity, the terms "can", "may", "and/or", "for example", "for example" and any other similar terms used in the present document should be interpreted as nonlimiting, such that any feature described in this way does not necessarily have to be present. Specifically, any combination of optional features is expressly envisaged without departing from the scope of the present disclosure, whether they are expressly claimed or not. The applicant reserves the right to modify any originally filed claim or to consequently file any new claim, including the right to modify any originally filed claim such that it depends on and/or incorporates any feature of any other claim, even if it was not originally claimed in this way.

Additionally, a person skilled in the art will appreciate that numerous variants of the embodiments described are conceivable without departing from the scope of the present disclosure.

Figure 2:
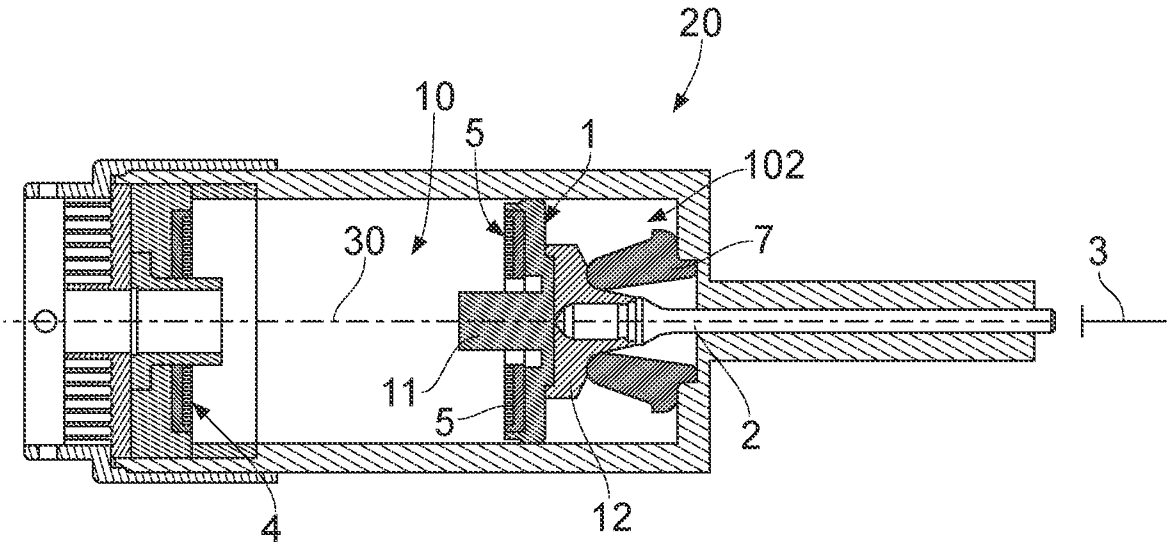
FIG. 2 illustrates the portable electric device of one embodiment of the present disclosure in an end position after activation of the piston, the piston being in contact with the bottom of the cylinder.

With reference now to FIGS. 1 to 2, FIG. 1 illustrates a portable electric device 20 comprising a cylinder 10 in which at least one movable piston 1 slides between a start position corresponding to the top of the cylinder 10 from a first face 101 and an end position corresponding to the bottom of the cylinder 10 with a second face 102, said piston comprising a mechanism 2 configured to come into contact with an element 3 to be operated once the piston is in the end position or is between the start position and the end position. In the example of FIG. 2, this mechanism 2 is a pin which slides along a longitudinal axis 30 of the cylinder 10, this axis being integral with the piston 1.

More specifically, the portable electric device comprises: (1) a power supply mechanism intended to supply power to a first fixed coil 4, the first fixed coil being positioned facing an expulsion mechanism 5 for expelling the piston when the piston is in the start position, the expulsion mechanism being secured to a first face of the movable piston; and (2) at least one braking mechanism 7 for braking the piston that is/are configured to brake the piston when the piston is in the end position or approaching the end position. The movable piston 1 being composed of: (A) a first part 11 made from a first material having an electromagnetic capability suitable for reducing magnetic losses and limiting the induction saturation; and (B) a second part 12 made from a second material suitable for withstanding shocks while or after the piston 1 makes contact with the braking mechanism.

Thus, once it has been supplied with power, the fixed coil 4 positioned facing the expulsion mechanism 5 makes it possible to expel the piston 1 in accordance with a well-known effect, the Thomson effect, which describes the relationship between an electric current (or an electric voltage) and a heat flux (or a temperature gradient) within a conductive material.

The power supply mechanism may be of the wired or battery-powered type.

The first part 11 is separated from the braking mechanism by the second part 12. Since such a first material is fragile and/or brittle when it is subjected to shocks, such a configuration makes it possible to protect the first part by insulating it from the shocks to which it is subjected once the movable piston is in the final position in which it abuts the bottom of the cylinder. In this instance, the second part 12, in addition to the braking mechanism 7 of the piston, acts as a shock damper for the first part.

Advantageously, the braking mechanism 7 is arranged over all or part of the bottom of the cylinder on the second face 102. In this configuration, the braking mechanism 7 is located on either side of the longitudinal axis 30 of the cylinder 10, thus enabling symmetrical damping of the shocks to which the movable piston is subjected when the latter comes into contact with the second face 102 of the cylinder.

Advantageously, the expulsion mechanism 5 is secured to a first face of the movable piston, said first face being located facing the first fixed coil 4. Thus, the piston is expelled symmetrically and uniformly along the longitudinal axis 30.

Moreover, the first material is an isotropic, soft magnetic composite material with high resistivity, for example of Somaloy type.

Advantageously, the second material is a material with damping properties.

In addition, in relation to FIG. 2, particularly when the piston 1 is in the end position in abutment against the second face 102, the second part 12 of the piston 1 and the braking mechanism conform to one another. Thus, such a configuration makes it possible to improve the damping effect of the braking mechanism 7 by closely matching the shapes of the second part 12 of the movable piston 12, the braking then being done gradually.

Moreover, the expulsion mechanism 5 is a conductive metallic ring secured to the first part 11 of the movable piston 1.

In a variant, the expulsion mechanism 5 is a coil secured to the first part 11 of the movable piston 1.

Thus, the Thomson effect is provided whether the expulsion mechanism 5 is made from a metallic ring or a coil.

In a variant, the first part 11 is surrounded by the second part 12, the second part being entirely or partially composed of said second material, the first face being secured to the second part 12. Since such a first material is fragile and/or brittle when it is subjected to shocks, such a configuration makes it possible to protect the first part by insulating it from the shocks to which is it subjected once the movable piston is in the final position in which it abuts the bottom of the cylinder. In this instance, the second part 12, in addition to the braking mechanism 7 of the piston, acts as a shock damper for the first part, the entirety of the first part 11 being protected against shocks in this case.

The invention claimed is:

1. A portable electric device comprising:

a cylinder in which a movable piston is slidable from a start position corresponding to a top of the cylinder to an end position corresponding to a bottom of the cylinder and back to the start position, the piston comprising a mechanism configured to contact an element when the piston slides from the start position toward the end position, an expulsion mechanism secured to a first face of the piston;

a first fixed coil positioned facing the expulsion mechanism;

a power supply mechanism configured to supply power to the first fixed coil to cause the expulsion mechanism to expel the piston; and a braking mechanism configured to brake the piston as the piston approaches the end position, wherein the piston has:

a first part including a first material having an electromagnetic capability to reduce magnetic losses and limit induction saturation and including an isotropic, soft magnetic composite material with high resistivity, and a second part including a second material configured to withstand shocks while or after the piston makes contact with the braking mechanism, wherein the first part is separated from the braking mechanism by the second part.

2. The portable electric device of claim 1, wherein the braking mechanism is arranged over all or part of the bottom of the cylinder.

3. The portable electric device of claim 1, wherein the expulsion mechanism is secured to a first face of the piston, the first face located facing the first fixed coil.

4. The portable electric device of claim 1, wherein the second material has damping properties.

5. The portable electric device of claim 1, wherein the second material and the braking mechanism are configured to conform to one another when the piston is in the end position.

6. The portable electric device of claim 1, wherein the expulsion mechanism includes a conductive metallic ring secured to the first part of the piston.

7. The portable electric device of claim 1, wherein the expulsion mechanism includes a coil secured to the first part of the movable piston.

8. The portable electric device of claim 1, wherein the first part is surrounded by the second part, the second part being entirely or partially composed of the second material.

9. The portable electric device of claim 8, wherein the first face is secured to the second part.

* * * * *